United States Patent

[11] 3,617,387

| [72] | Inventors | Carle Albert Grulke<br>Berea;<br>Thomas Arthur Reilly, Bay Village, both of Ohio |
|---|---|---|
| [21] | Appl. No. | 800,854 |
| [22] | Filed | Feb. 20, 1969 |
| [45] | Patented | Nov. 2, 1971 |
| [73] | Assignee | Union Carbide Corporation<br>New York, N.Y. |

[54] BATTERY CONSTRUCTION HAVING CELL COMPONENTS COMPLETELY INTERNALLY BONDED WITH ADHESIVE
12 Claims, 3 Drawing Figs.

[52] U.S. Cl. .................................................. 136/111, 136/33
[51] Int. Cl. ..................................................... H01m 21/00
[50] Field of Search........................................... 136/111, 108–110, 83, 6, 133, 134

[56] References Cited
UNITED STATES PATENTS

| 2,229,431 | 1/1941 | Young............................ | 136/111.5 |
| 2,519,053 | 8/1950 | Reinhardt...................... | 136/111.5 |
| 2,666,802 | 1/1954 | Woodring et al. ............. | 136/111 |
| 2,745,894 | 5/1956 | Nowotny....................... | 136/111 |
| 2,870,235 | 1/1959 | Soltis............................ | 136/111 |
| 3,306,777 | 2/1967 | Reid et al...................... | 136/111 |
| 3,438,816 | 4/1969 | Gruber.......................... | 136/111 |
| 3,440,105 | 4/1969 | Yamamoto et al. ........... | 136/111 |

*Primary Examiner*—Winston A. Douglas
*Assistant Examiner*—C. F. Lefevour
*Attorneys*—Paul A. Rose, John F. Hohmann and John R. Doherty ABSTRACT: An electric current producing cell which is completely internally bonded and requires the use of no external supports is obtained by bonding individual cell components to each other with a polymeric adhesive which maintains physical and electrical contact between the components.

INVENTORS
CARL A. GRULKE
THOMAS A. REILLY
BY John F. Hofmann
ATTORNEY

BATTERY CONSTRUCTION HAVING CELL COMPONENTS COMPLETELY INTERNALLY BONDED WITH ADHESIVE

This invention relates to improved battery construction and more particularly relates to batteries in which good physical and electrical contact between components is maintained through use of suitable adhesive materials.

There is a continuing demand for batteries having high output, low internal resistance and small volume to meet the expanded electronic applications made possible by transistors, integrated circuits and other solid state devices. To provide high-current at a reasonable operating voltage, the internal resistance of the battery must be kept very low. Present commercial dry batteries of all types depend entirely or in part on maintaining a positive contact pressure between the various cell components to insure low internal electrical resistance.

In high-voltage batteries composed of flat cells stacked in series, this pressure is normally obtained by tying the individual cells together to form the stack with paper or cloth tape, wrapping with string or crimping the completed cell assembly into a metal can. In conventional round cells the carbon rod, which acts as the cathode collector, is force-fitted within the bobbin to insure good contact. Cells based on the alkaline system, such as mercuric oxide-zinc, silver oxide-zinc and manganese dioxide-zinc, use cathodes molded at extremely high pressures to obtain low internal resistance values.

None of these approaches have been completely satisfactory since certain battery components, e.g., the cathode mix, tend to flow under maintained pressure until the applied force is equalized, thus resulting in erratic, unreliable or high resistance electrical contacts. In order to overcome the difficulties previously encountered in battery manufacture, it has been necessary to severely limit the choice of battery construction materials, sizes, and shapes. Furthermore, the need for auxiliary means to apply force hampers the aims of miniaturization by requiring extra volume for the tying materials.

The change in volume of reactants as service is withdrawn from the battery can also seriously change the internally established contacts. In the case of alkaline manganese dioxide batteries, for example, the cathode mix cake increases in volume during discharge so that a good binder is required in the mix cake in order to prevent excessive expansion and to maintain low contact resistance within the cell during discharge.

The problems associated with maintaining good electrical contact between cell elements are particularly notable in large area thin flat cell constructions where external supports are obviously impractical since such members may be many times the thickness of the cell itself. In addition, since such flat cells possess a very large surface area, the usual means employed for maintaining cell integrity along the periphery of the cell may not be sufficient to maintain good electrical contact between cell elements at the center of the flat cell.

It has previously been suggested in the prior flat cell art that adhesives be used in assembling specific cell components, for example, between cathode and cathode collector, between collector and the outer envelope, and between cells in a stack. These bonding techniques are set forth in detail in U.S. Pat. Nos. 2,870,235, 3,379,574, 2,762,858, 3,223,555, 2,658,098 and 2,487,985. The adhesives described in these patents have been suitable for use only in a very limited portion of the cell and could not be used to maintain the entire cell structure as an integral unit. For example, none of the adhesives previously suggested has been entirely suitable for use in providing permanent adhesion to the corroding face of the cell anode. In this connection, it is well known that during discharge of the cell the anode metal is consumed and physical voids occur on and in the anode surface. Proper wetting of the anode surface by the adhesive must be maintained for the adhesive to be effective. Thus, while limited use of adhesives has been made in the prior art, there has been no suggestion of the use of adhesives to completely internally bond a cell, thereby making external supports unnecessary.

It is an object of the present invention to provide a cell construction which is completely internally bonded.

It is another object of the invention to provide a cell construction wherein proper adhesion of cell components is maintained throughout storage and discharge of the cell.

It is another object of the invention to provide a cell construction which is internally bonded through use of an adhesive material which can be easily modified to obtain the required degree of ionic and/or electronic conductivity to be used effectively at every interface within the cell.

It is a further object of the invention to provide an adhesive which is or can be modified to provide an ionically conductive path between cell elements to permit the adhesive to additionally act as the electrolyte for the cell.

It is also an object of the invention to provide an electric current producing cell which is internally bonded in such a way that no external compression is required to maintain good electrical contact between the cell components. Such a construction would employ an adhesive between components of a particular cell and, if desired, between cells in a multicell battery construction, for example, a stack of thin, flat cells.

These and other objects are accomplished in an electric current producing cell having a metal anode, a body of cathode-depolarizer mix and a cathode collector wherein the anode is physically separated from the body of cathode-depolarizer mix but is adhesively secured to one surface of the body of cathode-depolarizer mix by a polymeric adhesive providing an ionically conductive path between the anode and the body of cathode-depolarizer mix, and the cathode collector is adhesively secured to the opposite surface of the body of cathode-depolarizer mix by an electronically conductive polymeric adhesive.

Typical of adhesives which are useful in accordance with the teachings of the present invention are polymeric materials which are adhesive, cohesive, conductive and stable.

The term "adhesive" as used herein refers to that property by which one material will wet and strongly cling to a surface. The term "cohesive" refers to that property by which a material will strongly cling to itself and maintain its integral structure. To be effective in the constructions of the present invention the polymeric material must display both of these properties. It must be adhesive in order to maintain good physical and electrical contact with the surfaces with which it comes in contact and it must be cohesive in order to hold adjacent components of the cell together for extended periods of time, even under the influence of forces developed during use.

In addition, the polymeric material must be conductive. This conductivity can be ionic or electronic or both depending upon the particular function for which the adhesive is used. For example, when used between components of a single electrode, e.g., cathode and cathode collector, primarily to hold the components together, the adhesive must be electronically conductive and can be ionically conductive. The same is true when the adhesive is used between cells in a stack. However, when the adhesive functions as the electrolyte for the cell and separates the anode and cathode, it must be ionically conductive only. The adhesive can itself be conductive or can be modified as will be described in greater detail to provide a conductive path through the layer of adhesive.

An additional requirement is that the adhesive be stable both with the materials of construction of the cell and with the byproducts of the cell reaction. This stability is necessary during the shelf life of the cell and during discharge.

The invention will be more particularly described with reference to the accompanying drawings in which.

Figure 1:
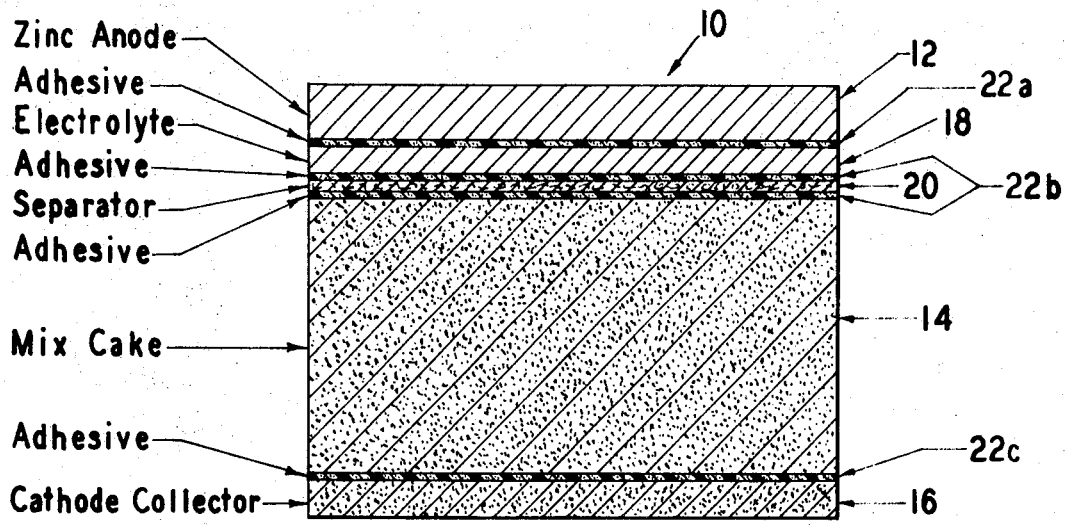
FIG. 1 is a greatly enlarged vertical section of a thin cell construction in accordance with the present invention.

Referring in more detail to the drawings there is shown in FIG. 1 an internally bonded unit cell generally designated 10 having an anode 12, a cathode 14 and a cathode collector 16. Between the anode and cathode are a layer of electrolyte 18 and a separator 20. At each interface within the cell there is an adhesive 22a, 22b, and 22c which acts to hold adjacent layers of the cell in physical and electrical contact as will now be described in greater detail.

Cell 10 comprises an anode 12, for example a thin zinc sheet, to which a solid electrolyte 18 is bonded by adhesive 22a. A separator 20, for example a thin sheet of bible paper, is adhesively secured to the opposite side of electrolyte 18. Adhesive 22b is absorbed by the separator 20 and is effective as an adhesive on both sides of the separator. It acts therefore to hold the separator 20 to the electrolyte 18 and also to hold the cathode 14 to the separator. The cathode in the cell depicted in FIG. 1 is made of a depolarizer mix cake, for example, of the Leclanche type containing manganese dioxide and carbon particles held together by a suitable permanent binder of the type described in this application.

The unit cell structure is completed by a cathode collector 16 of a flexible conductive material, e.g., a thin sheet of resin which has been made conductive by impregnation with carbon particles, which is secured to the cathode 14 by adhesive 22c.

Figure 2:
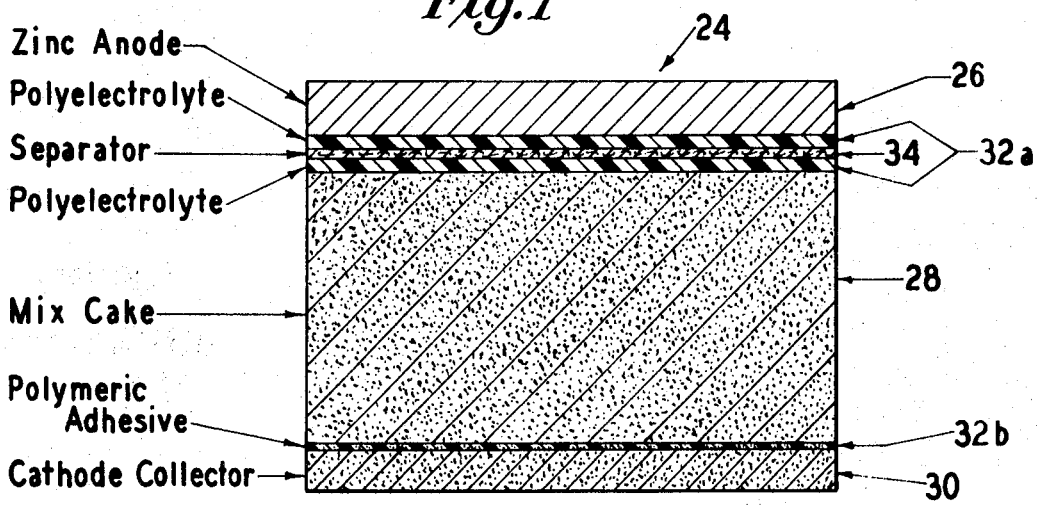
FIG. 2 is a greatly enlarged vertical section of a cell construction similar to that of FIG. 1 in which the cell adhesive additionally acts as the electrolyte for the cell.

FIG. 2 shows a unit cell 24 which is a variation of cell 10 and comprises a zinc anode 26, a cathode mix cake 28 and a cathode collector 30 each held in physical and electrical contact by adhesives 32a and 32b. However, in the embodiment shown in FIG. 2, the adhesive 32a is an ionically conductive adhesive and additionally acts as the electrolyte for the cell 24. Once again, a separator 34, for example, of bible paper, is used to assure physical separation between the anode 26 and the cathode 28. Adhesive 32b can be the same adhesive as adhesive 32a modified to be electronically conductive or can be a different adhesive since ionic conductivity is not necessary between the cathode 28 and the cathode collector 30.

Figure 3:
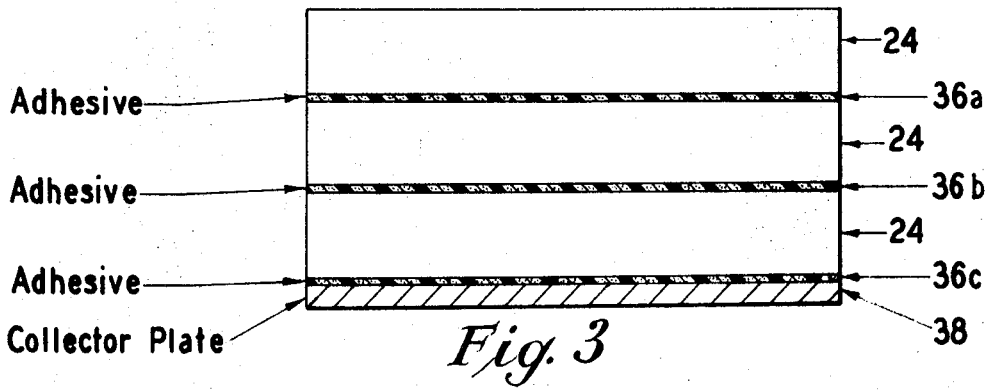
FIG. 3 is an enlarged diagrammatic vertical section of a battery stack of thin film cells wherein an adhesive is used to join the cell components as well as the individual cells in the stack.

FIG. 3 shows the manner in which three unit cells 24 (on enlarged scale, but smaller than the scale of FIG. 2) can be fabricated into an internally bonded battery stack. The individual components of cells 24 are not shown in the reduced scale of FIG. 3. The unit cells 24 are arranged in series and are maintained in physical and electrical contact by adhesive layers 36a and 36b which are electronically conductive. Since the outermost member in one unit cell is usually a thin unsupported cathode collector it is preferable, in a battery stack, to reinforce this member with a collector plate to add physical strength to the end of the battery and to more easily allow electrical contact to be made to the battery. An easy method of accomplishing these ends is to secure a metal collector plate 38 to the cathode collector 30 by an electronically conductive adhesive 36c. Suitable collector plates for this use are made of brass or tin.

If desired, the unit cells of FIGS. 1 and 2 and the battery stack of FIG. 3 can be enclosed in a lightweight liquid-impermeable outer wrapper (not shown) to prevent drying out.

The adhesive layers shown in the drawings can be formed in several different ways. For example, if the adhesive is a liquid, it can be painted or silk screened into place and, in miniature cells, it can be added dropwise during the assembly process. When the adhesive is a solid, for example, double faced tape or thermoplastic and thermosetting resin sheets, the adhesive layer can be cut to size and mechanically positioned. Thereafter, the appropriate setting step, for example, application of pressure and/or heat, can be accomplished.

From the above it will be obvious to those skilled in the art that the cell constructions of the present invention can be adapted for use with many of the various anodes, cathode, depolarizers, separators, and other materials of cell construction which have heretofore been used. It is the function of the adhesive to hold the cell together and, in the preferred embodiment, to additionally act as the electrolyte for the cell. The use of adhesives in the disclosed battery constructions is not limited by the particular materials of battery construction.

Of course, it is necessary that the adhesive be compatible with the members of the cell with which it comes in contact.

In general, any polymeric material which is ionically or electronically conductive or can be made ionically or electronically conductive through use of an appropriate conductive additive can be used in accordance with the teachings of the present invention. The term "ionically conductive," or the like, as used herein refers to the capability of the adhesive to permit the flow of ions from one electrode to the other. In many cases the ion flow will be of positive metallic ions from the anode to the cathode. In other cases, for example that of the common nickel-cadmium system, it is the hydrogen and hydroxyl ions rather than a metallic ion, which transports the charge through the electrolyte. The teachings of the invention are equally applicable to each of these types of ionic conductivity. In the instance where the adhesive is not acting as the cell electrolyte, but is present in addition to a liquid electrolyte, it is also necessary that the adhesive be substantially insoluble in the liquid electrolyte.

Suitable adhesive materials can be made from natural and synthetic condensation polymers such as wax, starch, methyl cellulose, carboxymethyl cellulose, hydroxyethyl cellulose, locust bean gum, gum arabic, gum karaya and gum tragacanth. These polymers are preferably at least partially insolubilized, for example, through a cross-linking reaction with formaldehyde, to control electrolyte absorption by the adhesive.

Vinyl polymers are particularly useful for forming adhesives since they can be made to be stable in the presence of strong electrolytes and oxidants such as used in the cathode and generally can be made sufficiently permeable to electrolyte. These polymers are particularly well suited for use in preparing adhesive electrolytes since they may be ionically conductive by themselves or may be used in combination with liquid electrolytes containing added salts for increased conductivity. For example, the usual Leclanche electrolyte consisting of an aqueous solution of ammonium chloride and zinc chloride may be dispersed in the polymeric composition.

The vinyl polymers preferred in the practice of this invention include polyacrylamide, polyacrylic acid, polyvinyl pyridine, polyvinyl methyl ether, methyl methacrylate and related acrylates, and polyvinyl pyrrolidone. Polyphosphates, epoxy-amine resins, melamine formaldehyde resins, and phenolic formaldehyde resins are also suitable for use.

The vinyl materials are preferred adhesives since they can be produced with the desired tackiness and in suitable viscosity ranges by polymerization and/or cross-linking the polymer to form gel structures. The cross-linking can conveniently be accomplished after the cell is assembled and the resulting gel structure provides excellent firmness and will decrease the tendency to pull away from adjoining surfaces on application of tensile force.

Heat fusible materials such as polyethylene or its fluorinated analogs can serve as the basis for a binder system which can be substituted for the vinyl materials described above.

When it is desired to utilize the polymeric adhesive as the electrolyte for the cell system, it is necessary to prepare a polymer which possesses the required electrochemical properties. In this embodiment the preferred polymers are those which possess a polymeric backbone having regularly disposed radicals attached along the polymer chain to form an ionically conductive sheath around the polymer backbone. Examples of preferred adhesives are the reaction product of polyacrylic acid, urea, and acetamide, and the reaction product of polyacrylamide, urea, and acetamide. Other materials of this type which are suitable for use in the cell constructions of the present invention are described in U.S. Pat. application Ser. No. 786,411, filed Dec. 23, 1968.

Among the cross-linked polymers, polyacrylamide is suitable and can be cross-linked by materials such as ethylene diamine, diallyl melamine, or triallyl cyanurate. In general, cross-linked reaction products having $-N=N-$, tertiary amine, or ether linkages are suitable for use in the present invention.

In addition to those resins which can be rendered conductive through a chemical reaction, other useful resins include those which can be made conductive by saturating the resin with a conductive liquid. For example, polyacrylamide can be saturated with an aqueous solution of zinc chloride and ammonium chloride, or the polymeric adhesive, which is itself nonconductive, can secure the various cell components together in a manner such that voids are formed in the adhesive layer which voids can be filled with a conductive material thereby supplying the ionically conductive path through the adhesive layer.

As used herein it should be understood that the terminology "providing an ionically conductive path," or the like, encompasses both of these mechanisms.

As has been previously mentioned, the adhesives according to the present invention can be modified for use at any interface in the battery. However, for optimum performance, it has been found that a polymeric adhesive should be used at every interface in the cell. For example, in the zinc/polyelectrolyte/manganese dioxide-carbon system, a polymeric adhesive is used to bond the cathode collector to the depolarizer, the depolarizer to the separator, and the separator to the anode metal. An adhesive can also be employed as a binder for the depolarizer. As will be obvious to those skilled in the art, when an adhesive is used as a binder for the depolarizer, it is not necessary that the adhesive material be conductive itself since the close proximity of the conductive particles in the depolarizer layer will assure conductivity even in the presence of a nonconductive binder. In this connection, in addition to bonding solely by adhesion, chelation reactions between the binder and the depolarizer may also be employed. For example, acetonyl acetone at a concentration of 10 parts per million or higher based on the weight of the depolarizer will bond manganese dioxide by a chelate mechanism to produce a very strong bond even in the wet cathode mix.

If the anode and the cathode collector are made of powdered materials, proper bonding of these members can also be achieved through use of the polymeric adhesive.

In the zinc/manganese dioxide system described above certain criteria have been established for obtaining optimum electrical resistance and physical strength in using polymeric adhesives. For optimum results, the adhesive film should have an electrical resistance of less than 0.01 ohm per square inch and a rupture strength of at least 1,200 pounds per square inch. The adhesive should also be chemically compatible with the active materials in this cell. For example, it should not substantially reduce the potential of the manganese dioxide depolarizer during the life of the cell.

In addition to the Leclanche system described above the battery constructions of the present invention are suitable for use in other well-known battery systems. In such other systems, for example, anode materials such as silver, magnesium, cadmium, copper, lead manganese and aluminum may be employed with appropriate cathodic materials.

In addition to the polyelectrolytes described above, any of the electrolyte materials conventionally used in such systems may be used with the adhesives disclosed. Suitable aqueous electrolytes, depending upon the compatibility of the materials involved include aqueous solutions of ammonium chloride, potassium hydroxide, sodium hydroxide, sulfuric acid, hydrochloric acid, sulfamic acid and sulfamates with appropriate gelling agents for immobilization. Solid electrolytes such as silver sulfide iodide ($Ag_3SI$) are also suitable for use.

Any of the conventional ionically permeable separators may be used in these systems.

In addition to manganese dioxide-carbon cathode of the Leclanche system, other useful cathodic materials include inorganic oxides such as silver oxide, cuprous oxide, cupric oxide, nickel oxide, mercuric oxide, ceric oxide, and lead oxide; inorganic halides such as silver chloride, silver bromide, and cupric chloride; inorganic perchlorates such as lithium perchlorate; polyhalides; organic oxidizing compounds having a quinoid structure such as p-benzoquinone; organic oxidizing compounds having nitro groups such as m-dinitrobenzene; nitroso groups such as m-nitrosobenzene; azo groups such as azodicarbonamide; organic peroxides such as t-butyl peroxyacetate; and charge transfer complexes such as perylene-iodine and phenothiazine-iodine complexes.

Preferred cathode collectors include Grafoil and any of the various resinous materials which can be made electronically conductive by impregnation with conductive particles, for example, carbon particles. Grafoil is a trademark for a flexible graphite material of expanded graphite particles compressed together. Grafoil is manufactured by Union Carbide Corporation, New York, New York and is the subject matter of U.S. Pat. No. 3,404,061.

The manner in which several specific materials of cell construction may be combined into complete unit cells is exemplified in the following table:

TABLE I.—TYPICAL INTERNALLY BONDED CELL CONSTRUCTIONS

| Anode | Electrolyte | Separator | Cathode-depolarizer [1] | Adhesive [1] | Cathode collector |
|---|---|---|---|---|---|
| Zinc | Water plus reaction product of poly acrylamide, urea and acetamide. | Tissue paper | Manganese dioxide | Reaction product of polyacrylamide, urea and acetamide. | Grafoil. |
| Do | Hydroxyethyl cellulose plus aqueous solution of magnesium chloride and ammonium chloride. | do | do | Hydroxyethyl cellulose | Do. |
| Manganese | Reaction product of polyacrylamide, urea and acetamide. | do | do | Reaction product of polyacrylamide, urea and acetamide. | Do. |
| Zinc | Polyvinyl chloride plus aqueous solution of magnesium chloride and ammonium chloride. | do | do | Poylvinyl chloride | Do. |
| Do | Hydroxyethyl cellulose plus aqueous solution of potassium hydroxide. | α-cellulose | do | Hydroxyethyl cellulose | Do. |
| Do | Aqueous solution of potassium hydroxide plus reaction product of poly acrylamide, urea and acetamide. | Nylon cloth | do | Reaction product of polyacryl amide, | Do. |
| Magnesium | Water plus reaction product of polyacrylic acid and glyoxal. | α-cellulose | do | Reaction product of polyacrylic acid and glyoxal. | Graphite disk. |
| Do | Aqueous solution of potassium hydroxide plus reaction product of polyacrylic acid and glyoxal. | do | do | Reaction product of polyacrylic acid and glyoxal. | Do. |
| Aluminum | Aqueous solution of potassium hydroxide plus reaction product of polyacrylic acid and glyoxal. | do | do | do | Do. |
| Do | Water plus reaction product of polyacrylic acid and glyoxal. | do | do | do | Do. |
| Lead | Polyvinyl chloride plus aqueous solution of fluoroboric acid. | do | Lead dioxide | Vinyl choride | Carbon coated zinc. |
| Zinc | Epoxy-amine plus aqueous solution of fluoroboric acid. | do | Manganese dioxide | Epoxy amine | Do. |
| Do | Melamine formaldehyde plus aqueous solution of zinc chloride and ammonium chloride. | do | do | Melamine formaldehyde | Do. |
| Do | Polyvinyl formaldehyde plus aqueous solution of zinc chloride and ammonium chloride. | do | do | Polyvinyl formaldehyde | Do. |

Table 1—Continued

| Anode | Electrolyte | Separator | Cathode-depolarizer [1] | Adhesive [1] | Cathode collector |
|---|---|---|---|---|---|
| Do | Hydroxyethyl cellulose plus aqueous solution of potassium hydroxide. | do | Mercuric oxide | Hydroxyethyl cellulose | Graphite. |
| Cadmium | Hydroxyethyl cellulose plus aqueous solution of potassium hydroxide. | Polypropylene. | Nickel oxide [NiO(OH)]. | do | Nickel. |
| Zinc | Reaction product of polyacrylamide, urea and acetamide. | Tissue paper | Ceric oxide | do | Graphite. |
| Copper | Reaction product of polyacrylamide, urea and acetamide. | α-cellulose | Cupric oxide | Reaction product of polyacrylamide, urea, and acetamide. | Do. |

[1] A conductive particulate material, e.g. carbon, is added to both cathode-depolarizer and adhesive for electronic conductivity.

The following examples are merely illustrative of the present invention and are not intended in any way to be limitative thereof:

EXAMPLE 1

A 0.008 inch thick zinc disk measuring 0.5 inch in diameter was coated around its periphery with a vinyl adhesive and a circle of vinyl tubing was heat sealed to the adhesive and allowed to extend upward from the surface of the zinc to form a basket shape. Into the basket was placed one drop of electrolyte of the reaction product of polyacrylamide, urea and acetamide prepared according to the disclosure of U.S. Pat. application Ser. No. 786,411. A 0.0005 inch thick tissue paper separator was added and another drop of electrolyte. This assembly was allowed to air-dry. A cathode-depolarizer mix cake 0.5 inch diameter by 0.068 inch thick was prepared from finely divided manganese dioxide, acetylene black and insolubilized hydroxyethyl cellulose in the approximate ratio of 50:6:1, respectively. The mix cake was added to the basket and a few drops of a conductive adhesive formed by adding carbon particles to a hydroxyethyl cellulose solution was placed on the surface of the mix cake. A thin sheet of Grafoil coated with the carbon-hydroxyethyl cellulose adhesive was added and the entire assembly was heat cured at 135° C.

The voltage of the resulting cell was 1.68 volts and, at a 22–30 percent water content in the electrolyte layer, displays a flat discharge curve at 1.20 bolts at 15 milliamperes per square inch of electrode area.

EXAMPLE 2

A thin sheet of zinc was coated on one side with a layer of carbon particles dispersed in vinyl resin. A 0.008 inch thick cathode-depolarizer mix layer of manganese dioxide, graphite and vinyl binder in a ratio of about 10:9:1, respectively, was added to the coated side of the zinc. The vinyl binder was a mixture of diisobutyl ketone, vinyl chloride-vinyl acetate copolymer and acrylate in a ratio of about 20:4:1, respectively. The assembly was air-dried and cured at 150° C. and 4,000 pounds per square inch of pressure.

Next the separator, a sheet of condenser paper, 0.004 inch in thickness, was impregnated with 10 milligrams per square inch (based on the dry weight of the binder material) of the binder solution given above diluted 1:2 with diisobutyl ketone.

The anode, a 0.016 inch thick sheet of zinc, was degreased, and coated on one side with the same binder solution given above to form a thin layer (1.0 milligram per square inch, dry resin weight based on zinc area). The coating was then air-dried. The vinyl-treated separator was placed on top of the mix and the anode on top of the separator.

The entire assembly was then heated to 65° C. at 15 pounds per square inch pressure to seal all the layers to each other.

When the cell was cool, aqueous-electrolyte was introduced to the interior of the cell through two small lateral holes previously drilled in the vinyl gasket. The electrolyte was a 10 percent by weight aqueous solution of fluoroboric acid. After the filling procedure was completed, the holes were sealed with hot wax containing a plasticizer.

The resulting cell was 3 inches in diameter and was discharged at 8 ohms resistance in series and performed as set forth in the following table:

TABLE II

| Time (Minutes) | Voltage | Amperage |
|---|---|---|
| 0 | 1.61 | 0.200 |
| 5 | 1.57 | 0.128 |
| 10 | 1.52 | 0.132 |
| 15 | 1.44 | 1.27 |
| 20 | 1.37 | 1.20 |
| 25 | 1.31 | 0.116 |
| 30 | 1.27 | 0.112 |
| 40 | 1.20 | 0.110 |
| 100 | 1.00 | 0.078 |

EXAMPLE 3

A cell assembly was made using a zinc anode, lead dioxide cathode and a paper separator. A modified epoxy thermosetting resin was used to bond the components together to yield a cell possessing good adhesion even after storage at high temperatures.

A carbon-coated zinc electrode, normally referred to as a duplex electrode was selected as the cathode collector. Onto it was applied a thin layer of a conductive adhesive consisting of approximately 50 per cent graphite particles, 30 percent of an epoxy resin having an epoxide equivalent of 180–195, an average molecular weight of 350–400 and a viscosity of 11,000–13,500 centipoise at 25° C. and 20 percent of a polyamine curing agent having an amine value of 290–320 and a viscosity of 40,000–60,000 centipoise at 25° C. in methyl acetate.

A mixture of equal parts lead dioxide and graphite containing 1 part of epoxy-amine binder for each 50 parts of lead dioxide-graphite mixture was spread onto the adhesive coated carbon surface, air-dried and pressed at 2,500 pounds per square inch into a 0.008 inch thick cake.

A 0.004 inch thick condenser paper separator was impregnated with 10 percent by weight epoxy-amine binder and air-dried. The separator was applied to the mix cake and the anode layer of zinc was applied to the separator.

The entire assembly was held under a pressure of 25 pounds per square inch at 75° C. for 15 minutes to thermoset the epoxy-amine adhesive. At the time of testing a 10 percent by weight aqueous solution of fluoroboric acid was added.

The resulting cell had a 1 square inch electrode surface and, when tested under 8 ohms resistance in series, performed as follows:

TABLE III

| Time (Minutes) | Voltage | Amperage |
|---|---|---|
| 0 | 2.15 | 0.160 |
| 5 | 1.80 | 0.120 |
| 10 | 1.82 | 0.122 |
| 15 | 1.82 | 0.122 |
| 20 | 1.75 | 0.118 |
| 25 | 1.70 | 0.116 |
| 30 | 1.65 | 0.111 |
| 35 | 1.61 | 0.107 |
| 40 | 1.57 | 0.104 |
| 200 | 1.80 | 0.105 |

EXAMPLE 4

A cell was constructed in a manner similar to example 3, except that the binder was a methanol dispersion of melamine formaldehyde at a ratio of 1 part binder to 4 parts lead dioxide-graphite mix and the curing was done at 150° C. for 15 minutes to set the melamine resin.

EXAMPLE 5

Cells similar to those described in example 1 were prepared with the circle of vinyl tubing omitted. The cathode molding pressure and external contact pressure were varied to determine their effect on well-bonded versus poorly bonded constructions.

Impedance measurements were made of the various cells and are set forth in the following table:

TABLE IV

| External contact pressure (p.s.i.) | Well-bonded | | Poorly-bonded | |
|---|---|---|---|---|
| | Cathode weight (gms.) | | | |
| | 0.03 | | 2.0 | |
| | Cathode molding pressure (p.s.i.) | | | |
| | 500 | 5,000 | 500 | 5,000 |
| 0.22 | 0.30 | 0.28 | 1.5 | 1.7 |
| 22 | 0.32 | 0.25 | 0.65 | 0.66 |

The difference in bonding in table IV was obtained by including a higher water content in the cathode mix. This excess of water interferred with the effectiveness of the adhesive layers and led to increased internal resistance.

An analysis of the data from the well-bonded area of the experiment shows a slight reduction in impedance as a result of higher cathode molding pressure, but this variance is not significant in view of the normal variation in impedance experienced throughout the experiment. In the poorly bonded area of the experiment, however, an obvious twofold improvement in the impedance is obtained by increasing the external pressure.

The adhesives of the present invention are effective in greatly reducing the internal resistance within the cell thereby making possible construction of cells having relatively high current capacities. As previously mentioned, prior art thin cell batteries have been capable of only very low currents and this has been true primarily because of the high internal resistance in the cells.

Various modifications of battery constructions will be obvious to those skilled in the art from the foregoing teachings. For example, if the adhesive layer is of sufficient thickness and cohesiveness, it will maintain physical separation between the anode and cathode to such an extent that an additional separator will be unnecessary. Also, when the adhesive is used as a binder for the cathode mix cake or a powdered electrode the amount of adhesive on the surface of the mix cake or electrode may be sufficient to give good physical and electrical contact with the adjacent layer and will make the use of an additional adhesive layer superfluous.

Moreover, while the present invention has been described specifically with reference to flat thin cells, it will be obvious that the teachings of internal bonding will be adaptable to other cell constructions, for example, cylindrical cells.

What is claimed is:

1. A completely internally bonded electric current producing cell, having no external compressive force, comprising a metal anode, a body of cathode-depolarizer mix and a cathode collector, said anode being physically separated from said body and being adhesively bonded to one surface of said body by a polymeric adhesive which is the electrolyte for the cell and provides an ionically conductive path between said anode and said body, and said cathode collector being adhesively bonded to the opposite surface of said body by an electronically conductive polymeric adhesive.

2. The cell according to claim 1 wherein said ionically conductive path includes a discrete layer of an ionically permeable separator material.

3. The cell according to claim 1 wherein said metal anode is zinc, said cathode collector is an electronically conductive resin and said first mentioned polymeric adhesive is polyacrylamide containing an aqueous solution of zinc chloride and ammonium chloride.

4. The cell according to claim 1 wherein said metal anode is zinc, said cathode collector is an electronically conductive resin and said first mentioned polymeric adhesive is polyacrylic acid containing an aqueous solution of zinc chloride and ammonium chloride.

5. The cell according to claim 1 wherein said metal anode is zinc, said cathode collector is an electronically conductive resin and said first mentioned polymeric adhesive is polyacrylamide containing an aqueous solution of zinc chloride.

6. The cell according to claim 1 wherein said metal anode is zinc, said cathode collector is an electronically conductive resin and said first mentioned polymeric adhesive is polyacrylic acid containing an aqueous solution of zinc chloride.

7. The cell according to claim 1 wherein said metal anode is zinc, said cathode collector is an electronically conductive resin and said first mentioned polymeric adhesive is the reaction product of polyacrylamide, urea and acetamide, containing an aqueous solution of zinc chloride and ammonium chloride.

8. The cell according to claim 1 wherein said metal anode is zinc, said cathode collector is an electronically conductive resin and said first mentioned polymeric adhesive is the reaction product of polyacrylic acid, urea and acetamide containing an aqueous solution of zinc chloride and ammonium chloride.

9. The cell according to claim 1 wherein said metal anode is zinc, said cathode collector is an electronically conductive resin and said first mentioned polymeric adhesive is the reaction product of polyacrylamide, urea and acetamide containing an aqueous solution of zinc chloride.

10. The cell according to claim 1 wherein said metal anode is zinc, said cathode collector is an electronically conductive resin and said first mentioned polymeric adhesive is the reaction product of polyacrylic acid, urea and acetamide containing an aqueous solution of zinc chloride.

11. The cell according to claim 1 wherein said metal anode is zinc, said cathode collector is an electronically conductive resin and said first mentioned polymeric adhesive is the reaction product of polyacrylamide, urea and acetamide.

12. The cell according to claim 1 wherein said metal anode is zinc, said cathode collector is an electronically conductive resin and said first mentioned polymeric adhesive is the reaction product of polyacrylic acid, urea and acetamide.

* * * * *